United States Statutory Invention Registration [19]

[11] Reg. Number: H237

Levy [43] Published: Mar. 3, 1987

[54] ARMATURE FOR SMALL CALIBER ELECTROMAGNETIC LAUNCH PROJECTILE

[75] Inventor: Stephen Levy, Ocean, NJ

[73] Assignee: The United States of America as represented by the Secretary of the Army, Washington, D.C.

[21] Appl. No.: 895,014

[22] Filed: Aug. 6, 1986

[51] Int. Cl.[4] ..... F42B 11/00

[52] U.S. Cl. ..... 102/517; 89/8; 102/501

*Primary Examiner*—Harold J. Tudor

*Attorney, Agent, or Firm*—Anthony T. Lane; Harold H. Card, Jr.; Michael C. Sachs

[57] ABSTRACT

The invention concerns an electromagnetically launched projectile having an armature comprised of refractory metal washers, each of which being coated with a thin film of cathode emitter material. The low work function metal generated by the heat of arcing rises to the armature surface through the capillaries formed between the armature washers. The arc occuring between the rail of the electromagnetic launcher and the armature is lowered due to the formation of a low voltage metallic discharge. The reduced arc drop lowers the erosion rate on the rails which reduces the rail damage resulting in increased firing rate and longer rail life.

18 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ARMATURE FOR SMALL CALIBER ELECTROMAGNETIC LAUNCH PROJECTILE

GOVERNMENTAL INTEREST

The invention described herein may be made, used, or licensed by or for the Government for Governmental purposes, without the payment to me of any royalties thereon.

BACKGROUND AND FIELD OF THE INVENTION

A small caliber electromagnetic launcher typically comprises a projectile, a rail launcher and a power generating means. The electromagnetic launcher might be a linear induction motor, where the projectile is accelerated along rails by a $J \times B$ force, where J is current density and B is magnetic flux density. To generate such a force however requires current to travel on the rails and pass between the rails through a conducting portion of the projectile, this conduction portion being known as the projectile armature. The greatest limitation to electromagnetic launchers however is believed found in the capabilities of the armature of the projectile and rails. The arc drop (approximately 20 volts) occurring between the rail and armature during launch of the projectile, with the multi-kiloampere rail current, causes excessive heating and a material erosion.

Clearly therefore any improvements in such mechanisms that would reduce the erosion, in armature and rail, and other advances to the art and science of rail gun weapons, would be of significant value for use in the field.

SUMMARY OF THE INVENTION

The invention concerns a small caliber projectile for electromagnetic launchers, which reduces projectile armature and rail erosion.

A projectile is presented having a nose; a body portion which functions as an armature when electromagnetically launched (e.g., as a rail gun); a tail end; and a threaded device which secures the body portion and tail to the nose via a threaded hole. The body portion comprises a series of washers to which a ring of low-work function material is bonded, the thickness of which determines the separation between adjacent washers. The material is a thin film of cathode coating. The body portion may also comprise a single solid porous refractory element with a low-work function material embedded within its pores, or a stack of coated wafers that could include some fraction of copper uncoated wafers interdispersed. Accordingly, the arc drop occurring at the rail-armature interface is reduced by the emission of surface electrons at low temperatures, thus reducing rail and armature erosion.

OBJECTS OF THE INVENTION

Accordingly, it is an object of this invention to provide an improved rail gun, capable of withstanding rail and armature erosion.

Another object of the invention is to provide an improved armature for a small caliber electromagnetic launch projectile weapon.

And even another object of this invention is to provide a projectile arrangement for launching by an electromagnetic launching mechanism.

Other objects and attendant advantages of this invention will become apparent from a study of the attached specification and a viewing of the drawings in which:

DETAILED DESCRIPTION OF THE INVENTION

Figure 1:
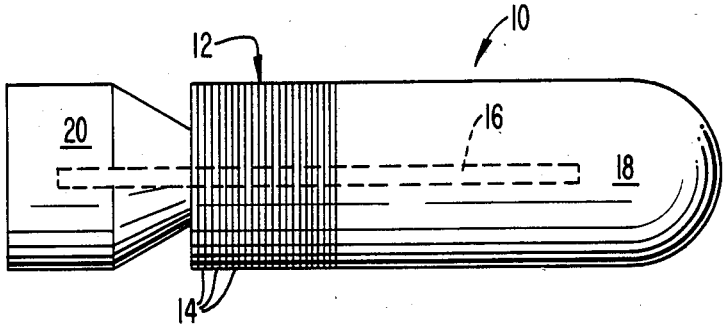
FIG. 1 illustrates an electromagnetic launch projectile.

FIG. 1 shows a projectile for launching with electromagnetic launchers. The projectile (10) includes an armature (12) consisting of approximately 60 copper washers (14). The washers (14) are stacked together and held in place between forward and rear phenolics (18, 20). With such a projectile (10), an arc drop during launch occurs, which at the multi-kiloampere rail current, causes excessive heating and material erosion to the rail and armature.

Figure 2:
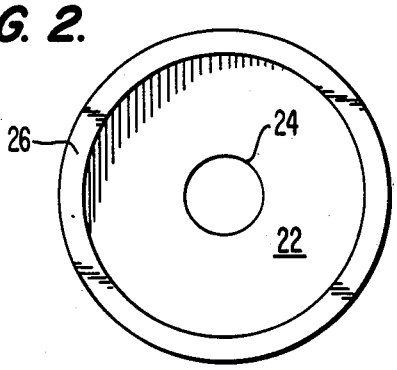
FIG. 2 shows a frontal view of a cathode coated washer.

An embodiment according to this invention, is illustrated in FIG. 2. A washer (22) typically comprised of a refractory metal such as tungsten, molybdenum, tantalum or rhenium is shown in frontal view. Accordingly, the thin film ring (26) is comprised of, a barium, strontium carbonate cathode coating mixture, as one example, deposited on the washer (22) surface.

Figure 3:
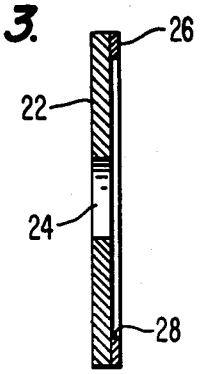
FIG. 3 shows a side, sectional view of the washer in FIG. 2.

FIG. 3 shows a cross-section of the FIG. 2 device. Here, it is evident that the thin film (ring 26) of thickness (28), normal to the surface of the washer (22), will determine the separation between any adjacent washers. This aspect is discussed with respect to FIG. 4.

Figure 4:
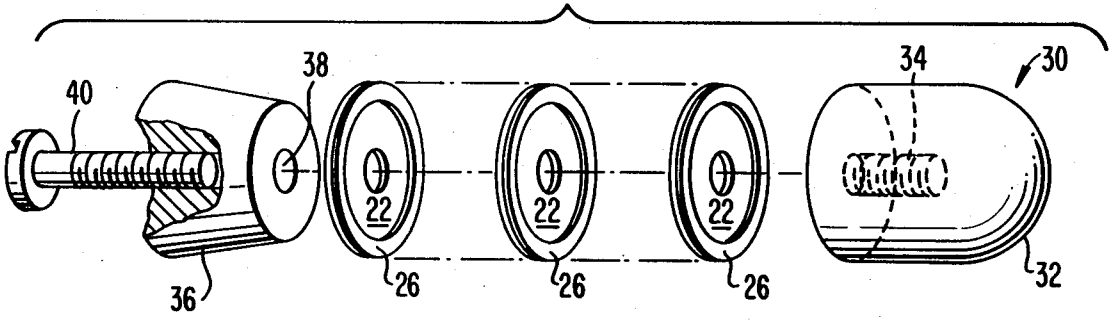
FIG. 4 shows an exploded view of a projectile in accordance with the present invention.

FIG. 4 depicts a projectile in accordance with the present invention. The projectile (30) includes a series of washers (22) having thin film ring cathodes (26), the series of washers comprising a body portion. The front of the projectile (30) is a nose (32) having a threaded hole (34). A tail section (36) has a hole (38) through which a threaded device (40) passes. The threaded device (40) may comprise a screw or bolt which mates with the threaded hole (34) of the nose (32) such that the body portion (in this embodiment the series of washers (22)) and tail (36) are secured to the nose (32).

Figure 5B:
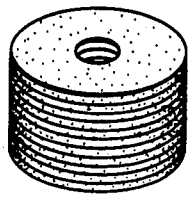
FIG. 5B shows a second alternate body portion for a projectile.
Figure 5A:
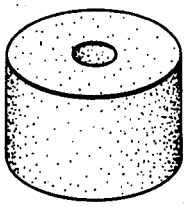
FIG. 5A shows a first alternate body portion of a projectile.

The washer stack could be replaced with a porous (FIG. 5*a*) or wafer structure (FIG. 5*b*) in which low work function material embedded in a refractory metal matrix, comprises the entire body portion. The low work function material is drawn to the surface of the rail-armature interface by the heat generated by the electric arcing at the rail-armature interface. The low work function material reaches the surface of a rail-armature interface to reduce arc drop. The washer stack could include one or more copper uncoated washers interdispersed to provide the optimum benefits of thermal conductivity from the copper and the optimum amount of electron emission from the coated washers.

An armature realized in accordance with FIG. 4 will reduce rail-armature arcing losses by lowering the work function of the armature surface. When the cathode material activates the low work function metal (cesium, barium, strontium calcium or strontium) is chemically released. The separation between the washers provided by the thickness of the coating also functions as a capillary drawing the low work function metal towards the armature surface. There the low work function metal coats the bare refractory metal surface lowering the overall armature work function. The washer stack with its layers of thermally isolating thin film rings (26) separating individual washers also serve to constrain the heating of the projectile to the armature region.

A plasma, comprised of electrons and ions, forms in the rail-armature interstice having a low arc drop characteristic of an alkali metal discharge. This plasma will appear behind the projectile as well as the interstice. The plasma should provide an additional force of the self-generated current density of the plasma interacting with the current it carries. The specific design of the armature and the spacing of the rail-armature interstice will determine the proportunate contributions of the $J \times B$ and/or plasma forces acting on the projectile.

A cathode coating may be easily deposited, by a spray gun, evaporation or through impregnation techniques.

Other substitutions and modifications to the invention will become apparent to those skilled in the art, which do not depart from the scope of the invention.

What is claimed is:

1. A projectile means, for launching via an electromagnetic launching means, including:

a nose end;

a body portion having a material comprising a means for providing a low-work function relative to the electromagnetic launching means;

a tail end; and a securing means for engaging the nose end, and for securing the body portion and tail end to the nose end.

2. A projectile means as in claim 1, the body portion having an orifice through which the securing means passes.

3. A projectile means as in claim 2, the material being porous.

4. A projectile means as in claim 3, the body portion comprising one solid porous element.

5. A projectile means as in claim 4, the nose end having a hole with which the securing means mates.

6. A projectile means as in claim 5, the securing means comprising a threaded device, and the hole having threads into which the securing means is threaded to mate with the hole.

7. A projectile means as in claim 3, the body portion comprising a series of adjacent wafers.

8. A projectile means as in claim 7, the nose end having a hole with which the securing means mates.

9. A projectile means as in claim 8, the securing means comprising a threaded device, and the hole having threads into which the securing means is threaded to mate with the hole.

10. A projectile means as in claim 2, the body portion comprising a series of disc-like means separated from one another by the means for providing a low work function material.

11. A projectile means as in claim 10, the disc-like means comprising a washer.

12. A projectile means as in claim 11, the means for providing a low work function material bonded to at least one side of each washer.

13. A projectile means as in claim 12, the means for providing a low work function material comprising a thin film ring attached to the washer side toward the circumference of the washer.

14. A projectile means as in claim 13, the ring having a thickness normal to the washer side, which determines the separation between adjacent washers.

15. A projectile means as in claim 14, the nose end having a hole with which the securing means mates.

16. A projectile means as in claim 15, the securing means comprising a threaded device, and the hole having threads into which the securing means is threaded to mate with the hole.

17. A projectile means as recited in claim 10, wherein each said washer is formed of refractory metal material with an electron emissive coating on the peripheral area thereof to provide spacing between the respective washers.

18. A projectile means as in claim 10, wherein the disc-like means comprises a plurality of interdispersed refractory coated washers with copper washers.

* * * * *